(12) United States Patent
Sato et al.

(10) Patent No.: US 11,007,918 B2
(45) Date of Patent: May 18, 2021

(54) RAMP APPARATUS FOR VEHICLE

(71) Applicant: AISIN KEIKINZOKU CO., LTD., Imizu (JP)

(72) Inventors: Eisuke Sato, Kariya (JP); Yohei Kanatani, Imizu (JP)

(73) Assignee: AISIN KEIKINZOKU CO., LTD.

( * ) Notice: Subject to any disclaimer, the term of this patent is extended or adjusted under 35 U.S.C. 154(b) by 0 days.

(21) Appl. No.: 16/889,868

(22) Filed: Jun. 2, 2020

(65) Prior Publication Data

US 2020/0376999 A1     Dec. 3, 2020

(30) Foreign Application Priority Data

Jun. 3, 2019 (JP) .............................. JP2019-103684

(51) Int. Cl.
*B60P 1/43* (2006.01)
(52) U.S. Cl.
CPC ................................... *B60P 1/431* (2013.01)
(58) Field of Classification Search
CPC ..................................................... B60P 1/431
See application file for complete search history.

(56) References Cited

U.S. PATENT DOCUMENTS

| 5,472,306 | A | 12/1995 | Stoll et al. | |
| 5,832,555 | A * | 11/1998 | Saucier | A61G 3/061 |
| | | | | 14/71.1 |
| 7,052,227 | B2 * | 5/2006 | Navarro | B60P 1/431 |
| | | | | 414/537 |
| 7,966,685 | B2 * | 6/2011 | Van Beek | B60P 1/431 |
| | | | | 14/71.1 |
| 8,413,280 | B2 * | 4/2013 | Goin | B60P 1/431 |
| | | | | 14/71.1 |
| 2013/0094931 | A1 * | 4/2013 | Bluhm | B60P 1/431 |
| | | | | 414/523 |

* cited by examiner

*Primary Examiner* — Jonathan Snelting
(74) *Attorney, Agent, or Firm* — Harness, Dickey & Pierce, P.L.C.

(57) ABSTRACT

A ramp apparatus for a vehicle includes a ramp retractable in the vehicle and drawable to an outside of the vehicle, a moving body movable in a drawing direction and a retracting direction together with the ramp, a support arm rotatably coupled with the ramp at a first rotatable coupling point and rotatably coupled with the moving body at a second rotatable coupling point, and a tension spring interposed between the ramp and the moving body. The ramp is arranged in a lifted-up position in which the ramp faces a door opening of the vehicle from a drawn position. The tension spring rotationally urges the first rotatable coupling point positioning above the tension spring in the drawn position of the ramp about the second rotatable coupling point and exerts an urging force on the ramp, the urging force moving the ramp from the drawn position toward the lifted-up position.

10 Claims, 12 Drawing Sheets

RAMP APPARATUS FOR VEHICLE

CROSS REFERENCE TO RELATED APPLICATION

This application is based upon and claims the benefit of priority to Japanese Patent Application No. 2019-103684 filed on Jun. 3, 2019, the entire contents of which are incorporated herein by reference.

BACKGROUND

The present disclosure relates to a ramp apparatus for a vehicle.

In related art, there has been a ramp apparatus for a vehicle in which a ramp is drawn and arranged at a lower end of a door opening. For example, a ramp apparatus disclosed in U.S. Pat. No. 5,472,306 includes a moving body that moves in drawing and retracting directions of the ramp and a support arm that is rotatably coupled with the moving body and the ramp. This ramp apparatus includes an expansion link rotatably coupled with the moving body and the ramp and a compression spring urging the expansion link in an expansion direction.

That is, in the ramp apparatus of the aforementioned technique in related art, a rear end portion of the ramp is lifted up, and the ramp thereby tilts with rotation of the support arm. At this point, it is possible to perform a lift-up operation in which the rear end portion of the ramp is easily lifted up based on the elastic force of the compression spring.

However, in the configuration of the aforementioned technique in related art, a rotatable coupling point of the expansion link is formed in a portion closer to the rear end portion of the ramp than a rotatable coupling point of the support arm for the ramp. There is a problem that the support arm thereby becomes long and higher support rigidity is thus demanded. Consequently, there still has been room for improvement.

BRIEF DESCRIPTION OF THE DRAWINGS

FIG. 9A and FIG. 9B are side views of the ramp apparatus in the second embodiment, in which FIG. 9A illustrates a retracted state of the ramp apparatus and FIG. 9B illustrates a drawn state (prior to the lift-up operation) of the ramp apparatus;

DESCRIPTION OF EXEMPLARY EMBODIMENTS

Figure 1:
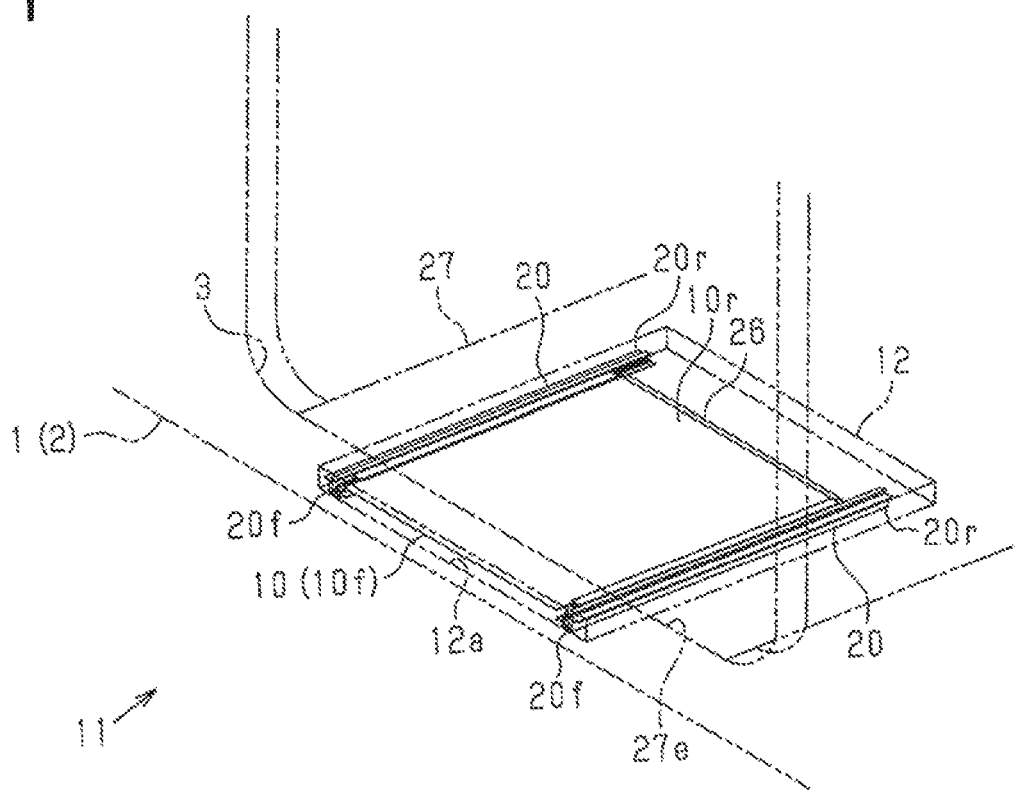
FIG. 1 is a perspective view of a ramp apparatus disposed below a door opening in a retracted state.
Figure 2:
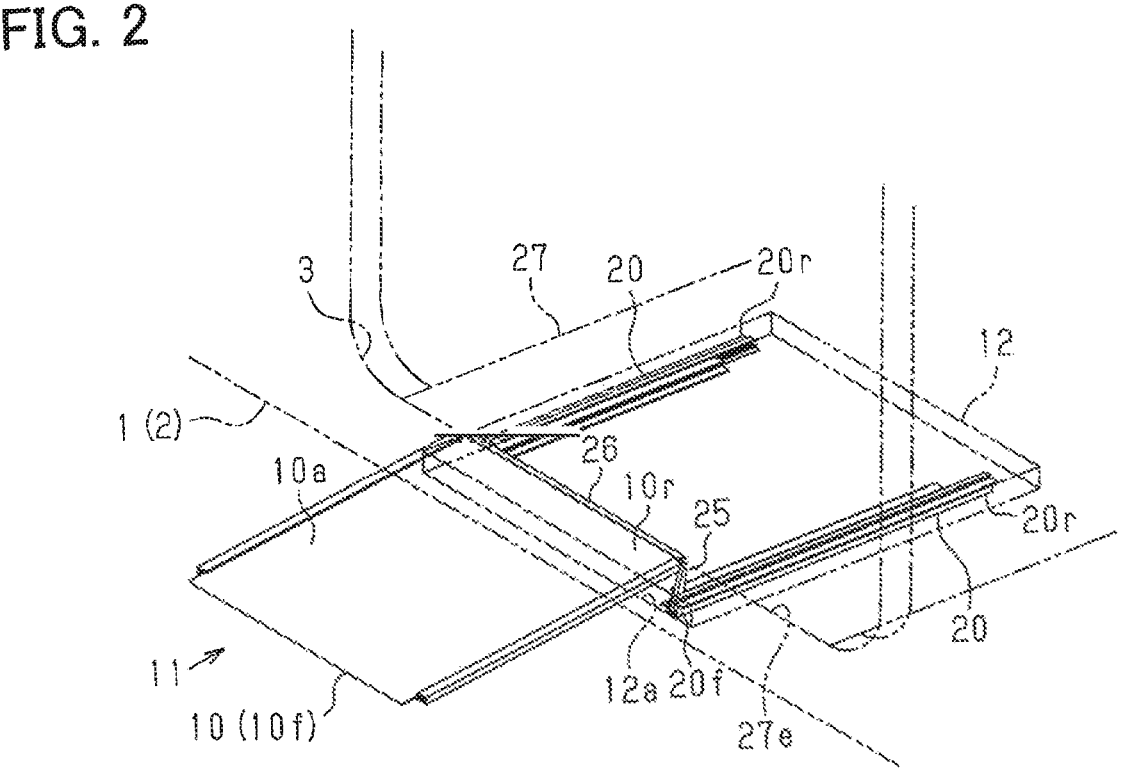
FIG. 2 is a perspective view of the ramp apparatus drawn from a portion below the door opening.

The present disclosure has been made for solving the aforementioned problem, and an object thereof is to provide a ramp apparatus for a vehicle in which a lift-up operation of a ramp may easily be performed in a compact configuration.

In accordance with one of some embodiments, a ramp apparatus for a vehicle for solving the aforementioned problem includes a ramp configured to be retractable in the vehicle and drawable to an outside of the vehicle, a moving body configured to be movable in a drawing direction and a retracting direction together with the ramp, a support arm rotatably coupled with the ramp at a first rotatable coupling point and rotatably coupled with the moving body at a second rotatable coupling point, and a tension spring interposed between the ramp and the moving body. The ramp is arranged in a lifted-up position in which the ramp is arranged to face a door opening of the vehicle from a drawn position by rotating of the first rotatable coupling point about the second rotatable coupling point via the support arm. The tension spring rotationally urges the first rotatable coupling point in a position above the tension spring in the drawn position of the ramp about the second rotatable coupling point and exerts an urging force on the ramp, the urging force moving the ramp from the drawn position toward the lifted-up position.

In the aforementioned configuration, the tension spring rotationally urges the first rotatable coupling point in the position above the tension spring in the drawn position of the ramp about the second rotatable coupling point. Consequently, an external force by which the ramp moves from the drawn position to the lifted-up position may be exerted. For arranging the first rotatable coupling point in the position above the tension spring in the drawn position of the ramp, a connection point of the tension spring with respect to the ramp may be set to a portion closer to a front end portion of the ramp than the first rotatable coupling point of the support arm with respect to the ramp. Consequently, the first rotatable coupling point may be set to a portion closer to a rear end portion of the ramp. Accordingly, the length of the support arm may be shortened. As described above, a ramp apparatus is provided in which the lift-up operation of the ramp may easily be performed based on an elastic force of the tension spring in a compact configuration.

In addition, the tension spring has an advantage that the elastic force may be used only by connecting both end portions of the tension spring with the moving body side and with the ramp side. Accordingly, simplification of the configuration may be intended.

The ramp apparatus for a vehicle for solving the aforementioned problem may further include a lower support member configured to regulate rotation of the support arm about the second rotatable coupling point such that the first rotatable coupling point does not move to a lower portion than the tension spring.

That is, in a case where the first rotatable coupling point of the support arm with respect to the ramp moves to a lower portion than the tension spring, the direction of the urging force produced by the tension spring is inverted. However, in the aforementioned configuration, the lower support member disposed below the support arm may regulate the rotation of the support arm in the direction in which the first rotatable coupling point moves downward. Accordingly, exertion of a stable urging force based on the elastic force of the tension spring may thereby be ensured.

The ramp apparatus for a vehicle for solving the aforementioned problem may further include a guide rail configured to guide the moving body in the drawing and retracting directions of the ramp. The moving body may include a sub-guide extending in an extension direction of the guide rail and configured to slide along the guide rail, and a support shoe having the second rotatable coupling point and configured to slide along an extension direction of the sub-guide. In this case, the sub-guide may constitute the lower support member.

In the aforementioned configuration, the sub-guide sliding along the guide rail elongates the guide rail, and this enables the length of the guide rail to be shortened. Accordingly, a configuration is made in which the guide rail is less visible from the outside of the vehicle in a case where the ramp is in a retracted state, and high designability may thereby be secured.

In addition, the sub-guide functions as the lower support member, and the rotation of the support arm in the direction in which the first rotatable coupling point moves downward from a support position in a case where the ramp moves in deploying and retracting directions may thereby be regulated. Accordingly, in a simple configuration, the first rotatable coupling point may be prevented from moving to a lower portion than the tension spring.

The ramp apparatus for a vehicle for solving the aforementioned problem may further include a pull-up member attached to an upper surface of the ramp.

In the aforementioned configuration, the pull-up member may be used to easily perform the lift-up operation of the ramp.

In the ramp apparatus for a vehicle for solving the aforementioned problem, the pull-up member may have a connection portion with respect to the ramp in a rear end portion of the ramp, and extend toward a front end portion of the ramp, the first rotatable coupling point being arranged in the rear end portion.

In the aforementioned configuration, a user positioned on the front end portion side of the ramp may grip the pull-up member without changing a standing position. Accordingly, following an operation for drawing the ramp, the lift-up operation of the ramp may easily be performed.

In the ramp apparatus for a vehicle for solving the aforementioned problem, the pull-up member may be a handle member having a grip portion protruding upward from the upper surface of the ramp.

In the aforementioned configuration, the lift-up operation of the ramp may easily be performed by using the pull-up member.

The ramp apparatus for a vehicle for solving the aforementioned problem may further include a locking member configured to regulate rotation of the ramp about the first rotatable coupling point and retain an attitude in a case where the ramp moves in the drawing and retracting directions.

In the aforementioned configuration, the ramp may be moved in the drawing and retracting directions in a state where the attitude of the ramp is stably retained.

In the ramp apparatus for a vehicle for solving the aforementioned problem, the locking mechanism may regulate rotation of the ramp in the lifted-up position.

In the aforementioned configuration, an inclination given to the ramp by rotation about the first rotatable coupling point may stably be retained.

The ramp apparatus for a vehicle for solving the aforementioned problem may further include a first engagement portion arranged in the ramp, and a second engagement portion arranged in the support arm. The locking mechanism may regulate rotation of the ramp by engagement between the first engagement portion and the second engagement portion.

In the aforementioned configuration, a highly reliable locking mechanism may be formed in a simple configuration.

The ramp apparatus for a vehicle for solving the aforementioned problem may further include a release operation unit arranged in a front end portion of the ramp on an opposite side from a rear end portion of the ramp and configured to release rotation regulation of the ramp by the locking mechanism, the first rotatable coupling point is arranged in the rear end portion.

In the aforementioned configuration, the user drawing the ramp to a lower end of the door opening may release the rotation regulation of the ramp by the locking mechanism while not changing the standing position but keeping being positioned on the front end portion side of the ramp and may shift the ramp to a lifted-up state. Accordingly, convenience for the user may be improved.

According to the present disclosure, the lift-up operation of the ramp may easily be performed in a compact configuration.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between. Further, when the first element is described as "moving" relative to the second element, such description includes embodiments in which at least one of the first element and the second element moves relative to the other.

First Embodiment

A first embodiment in which a ramp apparatus for a vehicle is realized will hereinafter be described with reference to drawings.

As illustrated in FIG. 1, FIG. 2, FIG. 3A, and FIG. 3B, in a vehicle 1 of the first embodiment, a ramp apparatus 11 for drawing a ramp 10 is arranged below a door opening 3 formed in a vehicle body 2. In the vehicle 1 of the first embodiment, the ramp apparatus 11 has the ramp 10 installed in a storage box 12 formed below the door opening 3, for example. Specifically, the storage box 12 has an opening 12a in an end portion in the longitudinal direction of the storage box 12, the end portion being on a side on which the door opening 3 of the vehicle 1 is positioned (a right end portion in FIG. 3A and FIG. 3B). The ramp apparatus 11 of the first embodiment is configured such that the ramp 10 retracted in the storage box 12 is drawn to the outside of the vehicle 1 via the opening 12a (FIG. 1) and the drawn ramp 10 is again retracted in the storage box 12 in the vehicle 1.

The door opening 3 in which the ramp apparatus 11 is installed is assumed to be a rear opening (back door) of the vehicle 1 or a side opening (side door) opened and closed by a slide door or a so-called glide door, for example. A wheelchair, a bicycle, and so forth, for example, may be loaded on a vehicle room by using the ramp 10 drawn to the outside from such a door opening 3.

In detail, the ramp apparatus 11 of the first embodiment includes the ramp 10, moving bodies 21, support arms 25, and tension springs 33.

Here, the ramp apparatus 11 may include a pair of guide rails 20 extending in drawing and retracting directions of the ramp 10, in other words, in a depth direction in the storage box 12 (left-right direction in FIG. 3A and FIG. 3B), for example. The guide rails 20 are arranged generally in parallel in such a manner that the ramp 10 retracted in the storage box 12 is placed between the guide rails 20 in the width direction of the ramp 10. The moving bodies 21 may include a pair of sliders 22 disposed slidably along the extension directions of the respective guide rails 20 with which the sliders 22 respectively engage in a state where the moving bodies 21 engage with the respective guide rails 20. The ramp apparatus 11 of the first embodiment may include a pair of support arms 25 that are each rotatably coupled with a rear end portion 10r of the ramp 10 drawn to the outside of the vehicle from the storage box 12 and are respectively rotatably coupled with the sliders 22.

Figure 3A:
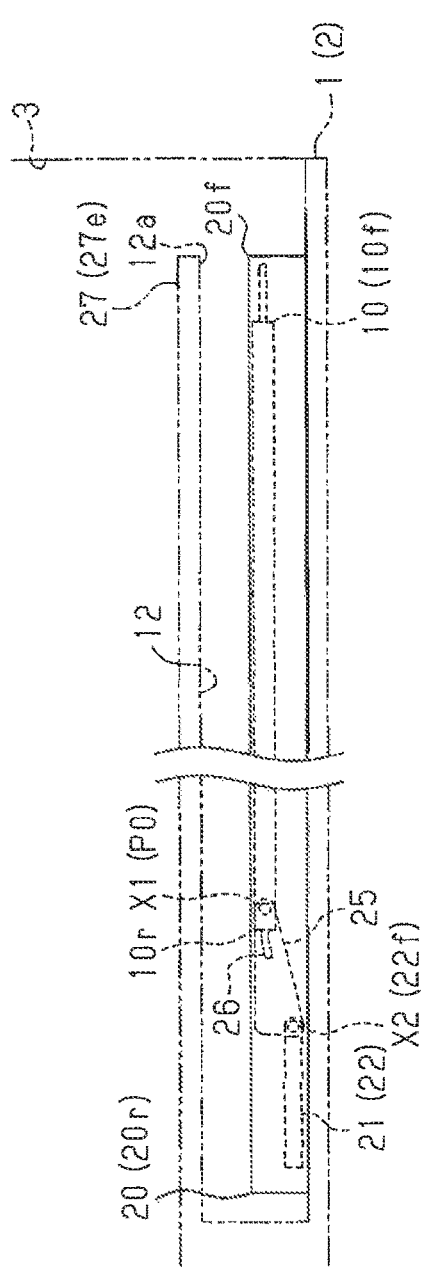
FIG. 3A is a side view of the ramp apparatus in the retracted state.

The support arms 25 are rotatably coupled with the ramp 10 at first rotatable coupling points X1 and are rotatably coupled with the respective moving bodies 21 (the pair of sliders 22) at second rotatable coupling points X2. Specifically, as illustrated in FIG. 3A, the second rotatable coupling points X2 are disposed in front end portions 22f of the respective sliders 22. As illustrated in FIG. 3A, when the ramp 10 is retracted or drawn, the first rotatable coupling points X1 are arranged on an downstream side of the second rotatable coupling points X2 in the drawing direction of the ramp 10. When the sliders 22 slide along the respective guide rails 20, rotation of the support arms 25 about those first rotatable coupling points X1 and second rotatable coupling points X2 as pivots may be regulated by an internal wall of the storage box 12, for example. The ramp apparatus 11 of the first embodiment is configured such that the ramp 10 thereby moves along the extension directions of the respective guide rails 20 together with the sliders 22 and the support arms 25 in a state where the ramp 10 retains a generally horizontal attitude. In the ramp apparatus 11 of the first embodiment, the second rotatable coupling points X2 of the respective support arms 25 with respect to the respective sliders 22 move toward the front of front end portions 20f of the respective guide rails 20 (right side in FIG. 3A and FIG. 3B), in other words, in the drawing direction of the ramp 10, and the rotation of the support arms 25 about the first rotatable coupling points X1 and second rotatable coupling points X2 as pivots is thereby allowed.

Figure 3B:
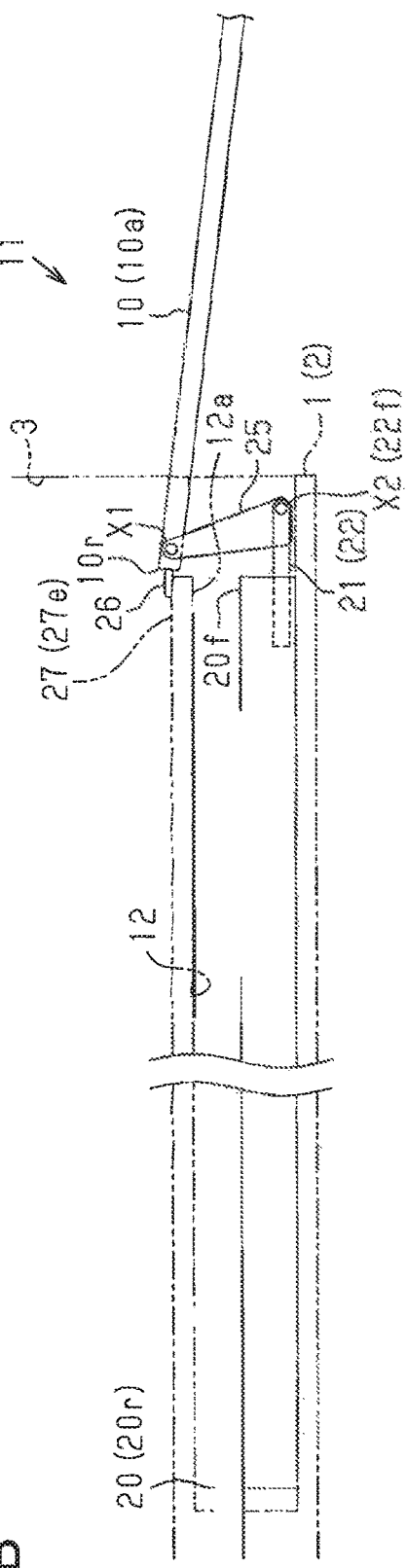
FIG. 3B is a side view of the ramp apparatus in a drawn state.

Specifically, in the ramp apparatus 11 of the first embodiment, in a case where the ramp 10 is in a state of being drawn to the outside of the door opening 3 (drawn position), the support arms 25 may be rotated counterclockwise in FIG. 3B about the second rotatable coupling points X2. The rotation of the support arms 25 causes the first rotatable coupling points X1 of the respective support arms 25 with respect to the ramp 10 to be lifted upward while moving rearward, and the ramp 10 rotates clockwise in FIG. 3B about the first rotatable coupling points X1 as pivots and is set to a lifted-up position. The ramp apparatus 11 of the first embodiment is configured such that the ramp 10 drawn to a lower end of the door opening 3 is thereby inclined.

In the ramp apparatus 11 of the first embodiment, a floor engagement portion 26 extending rearward is attached to the rear end portion 10r of the ramp 10. That is, in the ramp apparatus 11 of the first embodiment, the support arms 25 are rotated in a direction to lift up the first rotatable coupling points X1 from support positions P0 (FIG. 3A) in a case where the ramp 10 is moved in the drawing and retracting directions as described above, and the rear end portion 10r of the ramp 10 thereby becomes close to an edge portion 27e of a vehicle floor 27 facing the door opening 3. Accordingly, the ramp apparatus 11 of the first embodiment is configured such that the floor engagement portion 26 attached to the rear end portion 10r of the ramp 10 engages the edge portion 27e of the vehicle floor 27 and the load of the ramp 10 is thereby supported by the vehicle floor 27.

When the ramp apparatus 11 of the first embodiment is shifted to the lifted-up position in which the rear end portion 10r of the ramp 10 is lifted up by such rotation of the support arms 25, the first rotatable coupling points X1 of the respective support arms 25 with respect to the ramp 10 exceed the second rotatable coupling points X2 with respect to the respective sliders 22 and move to the rear (left side in FIG. 3A and FIG. 3B). Accordingly, a configuration is made such that the rear end portion 10r of the ramp 10 approaches the vehicle floor 27 while gently lowering the position lifted up by the rotation of the support arms 25 and thereby smoothly engages with the edge portion 27e.

Figure 4:
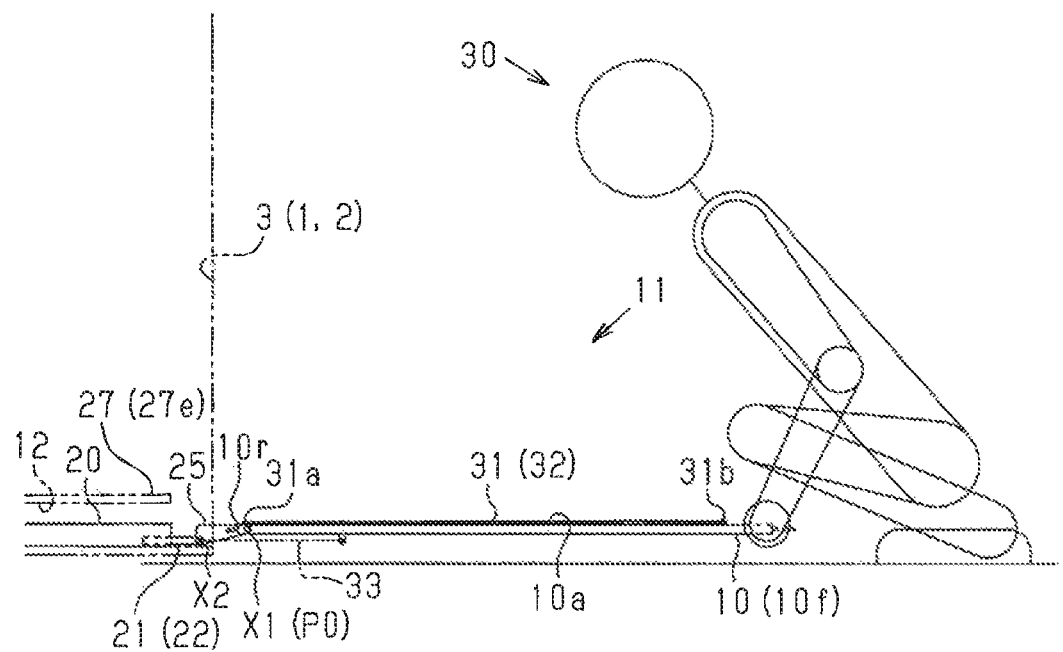
FIG. 4 is an explanatory diagram of an operation for drawing the ramp from a storage box.
Figure 5:
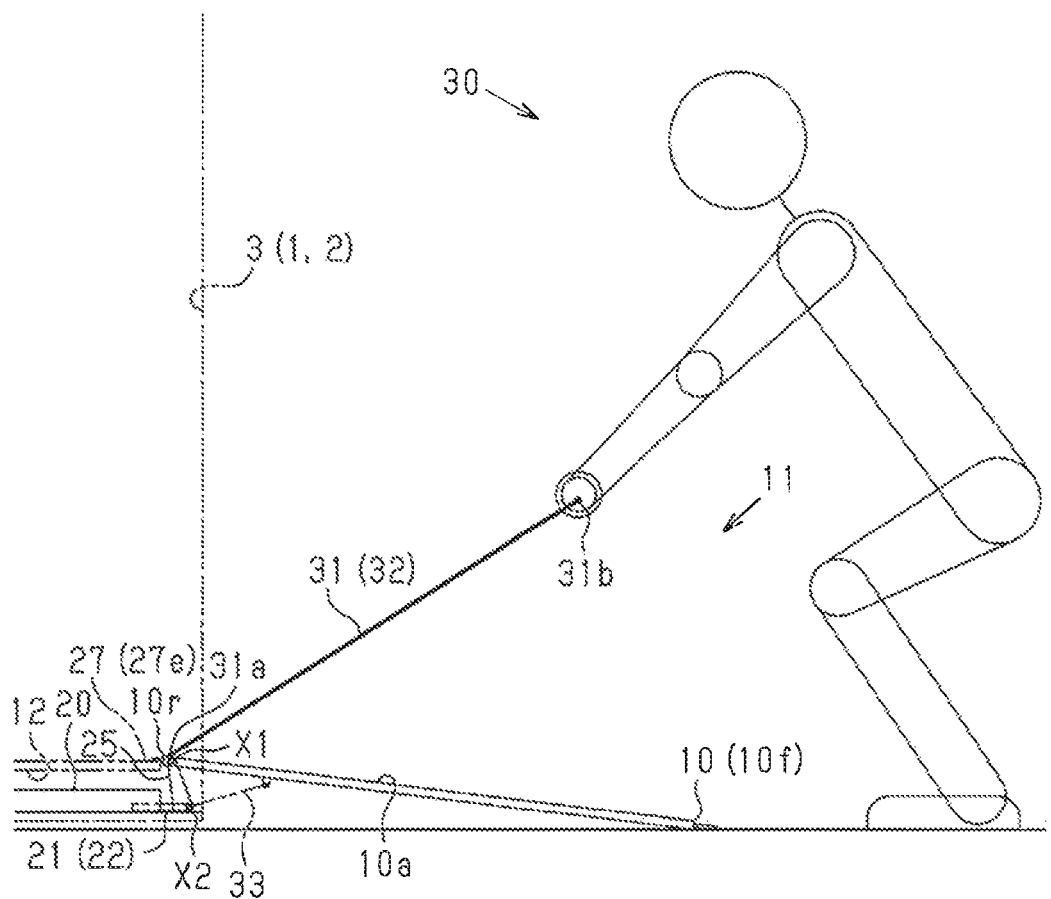
FIG. 5 is an explanatory diagram of a lift-up operation for lifting up a rear end portion of the ramp.

More in detail, as illustrated in FIG. 4 and FIG. 5, in the ramp apparatus 11 of the first embodiment, a user 30 draws the ramp 10 from the storage box 12 in a state of gripping a front end portion 10f, and the rear end portion 10r of the ramp 10 may thereby be drawn to the lower end of the door opening 3. The ramp apparatus 11 of the first embodiment includes a pull-up member 31 attached to an upper surface 10a of the ramp 10. In the ramp apparatus 11 of the first embodiment, it is possible to easily lift up the rear end portion 10r of the ramp 10 by using the pull-up member 31, that is, perform the lift-up operation.

Specifically, the pull-up member 31 of the first embodiment has connection portions 31a in the rear end portion 10r of the ramp 10 and has a configuration as a rod-shaped member 32 extending toward the front end portion 10f side in the longitudinal direction of the ramp 10. That is, with the pull-up member 31, the user 30 is capable of gripping a free end 31b side while keeping being positioned on the front end portion 10f side of the ramp 10. The pull-up member 31 is configured to rotate upward and downward about the connection portions 31a as pivots. Accordingly, in the ramp apparatus 11 of the first embodiment, the user 30 drawing the ramp 10 from the storage box 12 operates the pull-up member 31 and is thereby capable of easily lifting up the rear end portion 10r of the ramp 10 and of shifting the ramp 10 to the lifted-up position without changing the standing position.

In the ramp apparatus 11 of the first embodiment, the user 30 pulls the ramp 10 forward and may thereby release the ramp 10 from the lifted-up state. In other words, the support arms 25 may be rotated clockwise in FIG. 5 about the second rotatable coupling points X2 with respect to the respective sliders 22 as pivots. The rotation of the support arms 25 causes the first rotatable coupling points X1 of the respective support arms 25 with respect to the ramp 10 to be pulled downward while moving forward, and the ramp 10 rotates counterclockwise in each of the drawings about the first rotatable coupling points X1 as pivots. Accordingly, the ramp apparatus 11 of the first embodiment is capable of retracting the ramp 10 in the storage box 12 such that the ramp 10 is pushed in a state where the ramp 10 is generally horizontal.

Figure 6:
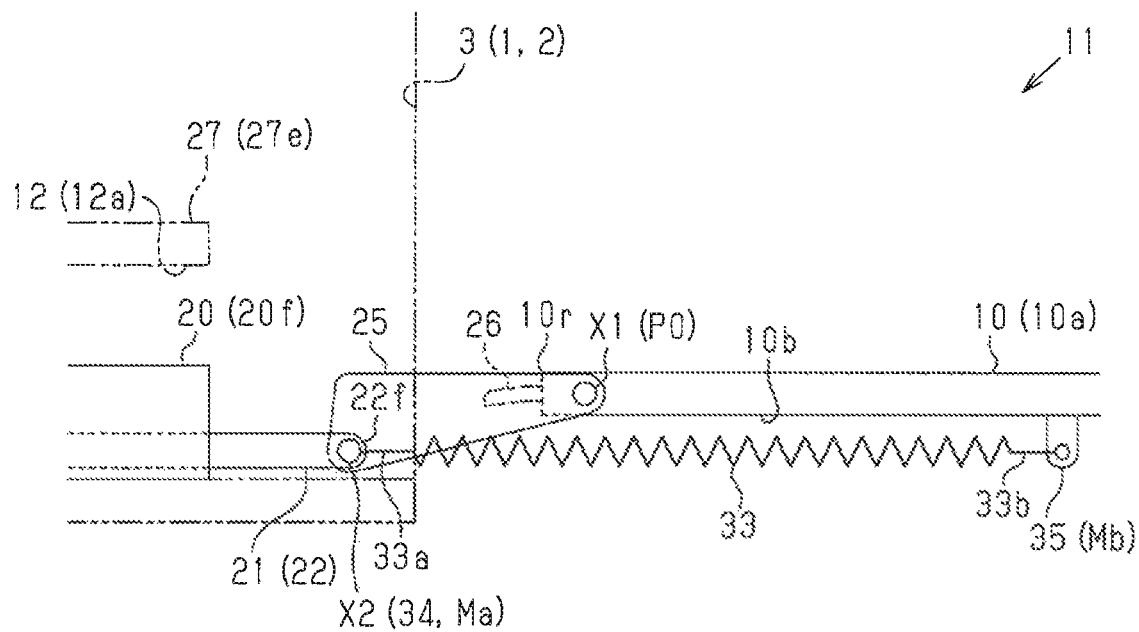
FIG. 6 is an explanatory diagram of a tension spring interposed between a moving body and the ramp prior to the lift-up operation.
Figure 7:
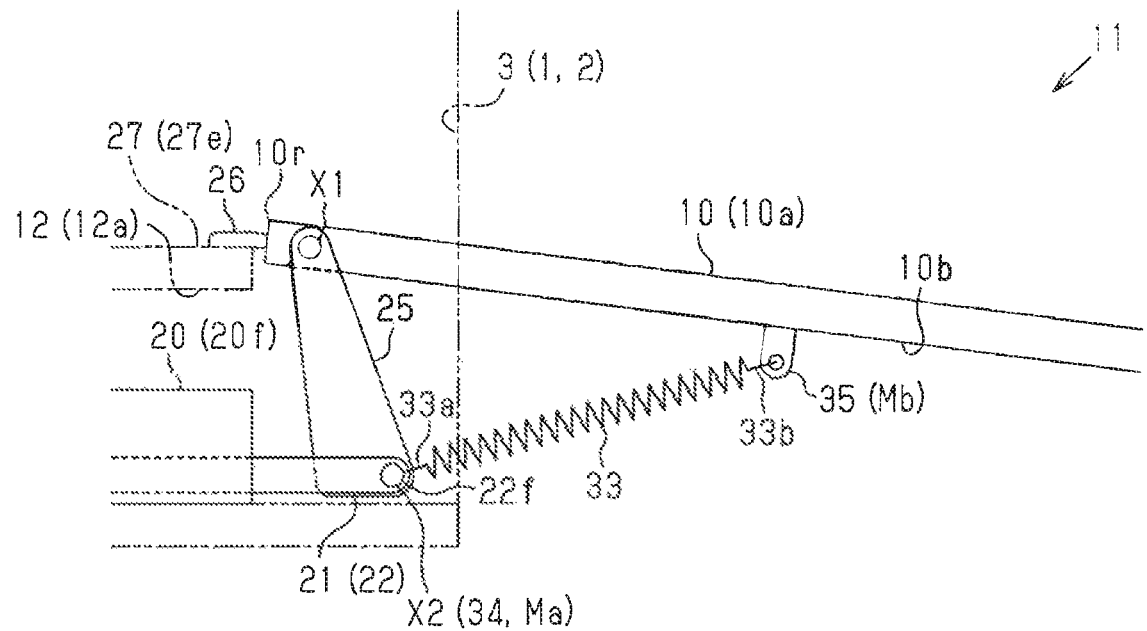
FIG. 7 is an explanatory diagram of the tension spring interposed between the moving body and the ramp subsequent to the lift-up operation.

As illustrated in FIG. 6 and FIG. 7, the ramp apparatus 11 of the first embodiment includes the pair of tension springs 33 interposed between the ramp 10 and the respective sliders 22, for example. In the ramp apparatus 11 of the first embodiment, when the ramp 10 moves in the drawing and retracting directions (FIG. 3A) and when the ramp 10 is in the drawn position (FIG. 6), urging forces of the respective tension springs 33 are exerted in directions to lift up the first rotatable coupling points X1 as illustrated in FIG. 7 from the support positions P0 illustrated in FIG. 3A and FIG. 6.

Specifically, in the ramp apparatus 11 of the first embodiment, first end portions 33a of the respective tension springs 33 are hooked on the second rotatable coupling points X2 of the respective support arms 25 with respect to the respective sliders 22, specifically, on shaft members 34 configuring the second rotatable coupling points X2 in the front end portions 22f of the respective sliders 22. In the ramp 10, a pair of hooking protrusions 35 extending downward from a lower surface 10b of the ramp 10 are arranged in positions closer to the front end portion 10f than the first rotatable coupling points X1 of the respective support arms 25. Second end portions 33b of the respective tension springs 33 are hooked on the respective hooking protrusions 35.

In the ramp apparatus 11 of the first embodiment, as illustrated in FIG. 3A and FIG. 6, the first rotatable coupling points X1 are arranged in the support positions P0 above the respective tension springs 33. Accordingly, the ramp apparatus 11 of the first embodiment is configured such that the urging forces for rotating the respective support arms 25 in a direction to lift up the rear end portion 10r of the ramp 10 to which the first rotatable coupling points X1 are set, in other words, the urging forces in a direction to lift up the ramp 10 are produced by the respective tension springs 33.

That is, those tension springs 33 produce elastic forces in directions in which mutual drawing occurs between connection points Ma with respect to the respective sliders 22 and connection points Mb with respect to the ramp 10, in other words, between the front end portions 22f of the respective sliders 22, on which the first end portions 33a are hooked, and the respective hooking protrusions 35, on which the second end portions 33b are hooked, on the ramp 10 side. Based on the elastic forces, the support arms 25 are caused to perform relative rotation with respect to the ramp 10 about the first rotatable coupling points X1 as pivots in a form in which the support arms 25 and the ramp 10 are folded. Accordingly, the ramp apparatus 11 of the first embodiment is configured such that the support arms 25 are caused to rotate about the second rotatable coupling points X2 with respect to the respective sliders 22 and the urging forces in the direction to lift up the ramp 10 are thereby exerted.

In the ramp apparatus 11 of the first embodiment, the urging forces exerted based on the elastic forces of the respective tension springs 33 are set to magnitudes adequate for assisting the aforementioned lift-up operation of the ramp 10 by the user 30. Accordingly, in the ramp apparatus 11 of the first embodiment, it is possible to maintain the attitude of the ramp 10 generally horizontal in drawing and retracting operations and to easily lift up the rear end portion 10r of the ramp 10 by a small force in the lift-up operation.

Next, effects of the first embodiment will be described.

(1) The ramp apparatus 11 includes the ramp 10 drawn to the lower end of the door opening 3, the slider 22 as the moving body 21 moving in the drawing and retracting directions of the ramp 10, and the support arm 25 rotatably coupled with the ramp 10 and rotatably coupled with the slider 22. The ramp apparatus 11 includes the tension spring 33 interposed between the ramp 10 and the slider 22. In the ramp apparatus 11, the first rotatable coupling point X1 is arranged above the tension spring 33. Accordingly, based on the elastic force of the tension spring 33, the urging force is exerted in the direction in which the first rotatable coupling point X1 is lifted up from the support position P0 in a case where the ramp 10 moves in the drawing and retracting directions (FIG. 3A) and a case where the ramp 10 is in the drawn position (FIG. 6).

In the aforementioned configuration, the connection point Mb of the tension spring 33 with respect to the ramp 10 is set to a portion closer to the front end portion 10f of the ramp 10 than the first rotatable coupling point X1, and the first rotatable coupling point X1 may thereby be set to a portion closer to the rear end portion 10r of the ramp 10. Accordingly, the length of the support arm 25 is shortened, and the lift-up operation of the ramp 10 may thereby easily be performed based on the elastic force of the tension spring 33 in a compact configuration.

In addition, the tension spring 33 has an advantage that the elastic force may be used only by connecting both end portions of the tension spring 33 with the slider 22 side as the moving body 21 and with the ramp 10 side. Accordingly, simplification of the configuration may be intended.

(2) The ramp apparatus 11 of the first embodiment includes the pull-up member 31 attached to the upper surface 10a of the ramp 10. The pull-up member 31 has the connection portions 31a with respect to the ramp 10 in the rear end portion 10r, in which the first rotatable coupling points X1 are arranged, of the ramp 10 and extends toward the front end portion 10f side.

In the aforementioned configuration, the pull-up member 31 is used, and the user 30 may thereby easily perform the lift-up operation of the ramp 10. The user 30 positioned on the front end portion 10f side of the ramp 10 may grip the pull-up member 31 without changing the standing position. Accordingly, following an operation for drawing the ramp 10 from the storage box 12, the lift-up operation of the ramp 10 may easily be performed.

(3) The pull-up member 31 has a configuration as the rod-shaped member 32 rotatable upward and downward about the connection portions 31a with respect to the ramp 10 as pivots. In the aforementioned configuration, high operation rigidity as the pull-up member 31 may be secured without impairing gripping easiness. Accordingly, not only a simple pull-up operation but also operation input in all directions is enabled, and higher operability may be secured.

Second Embodiment

A second embodiment in which a ramp apparatus for a vehicle is realized will hereinafter be described with reference to drawings. For convenience of description, the same reference characters will be given to similar configurations to the first embodiment, and descriptions thereof will not be made.

Figure 8:
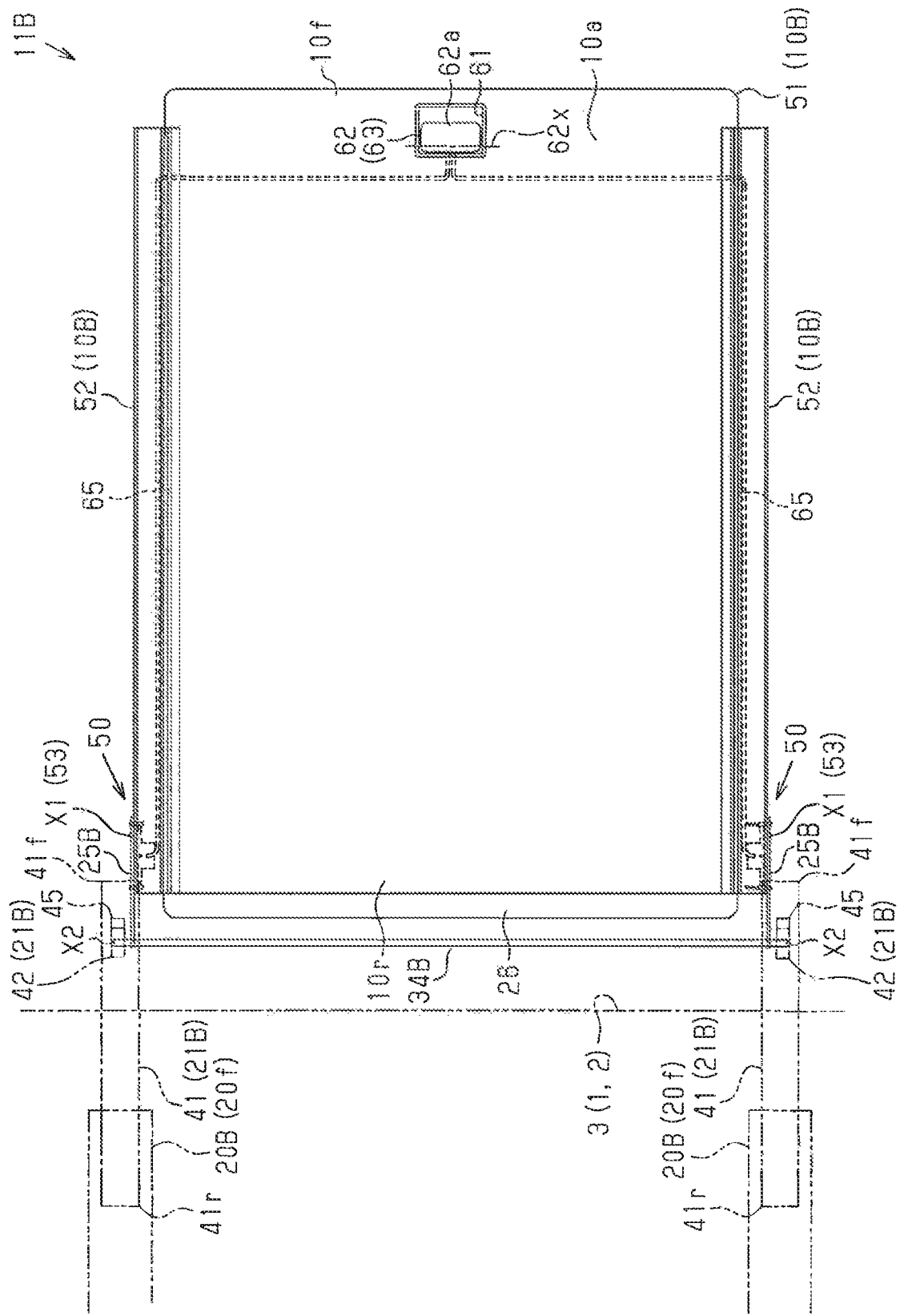
FIG. 8 is a plan view of a ramp apparatus in a second embodiment.
Figure 9A:
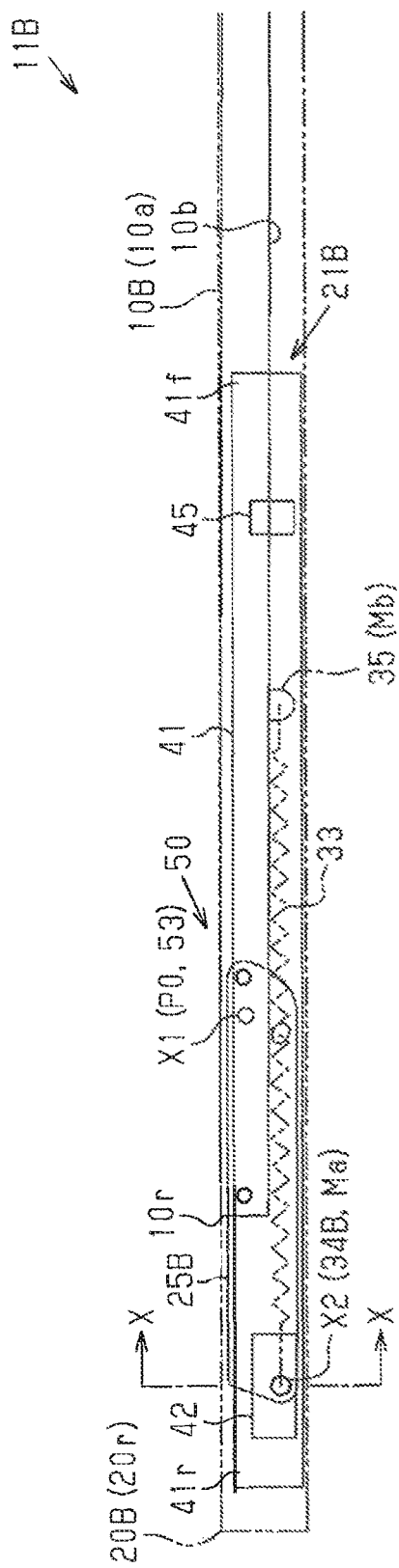
Figure 9B:
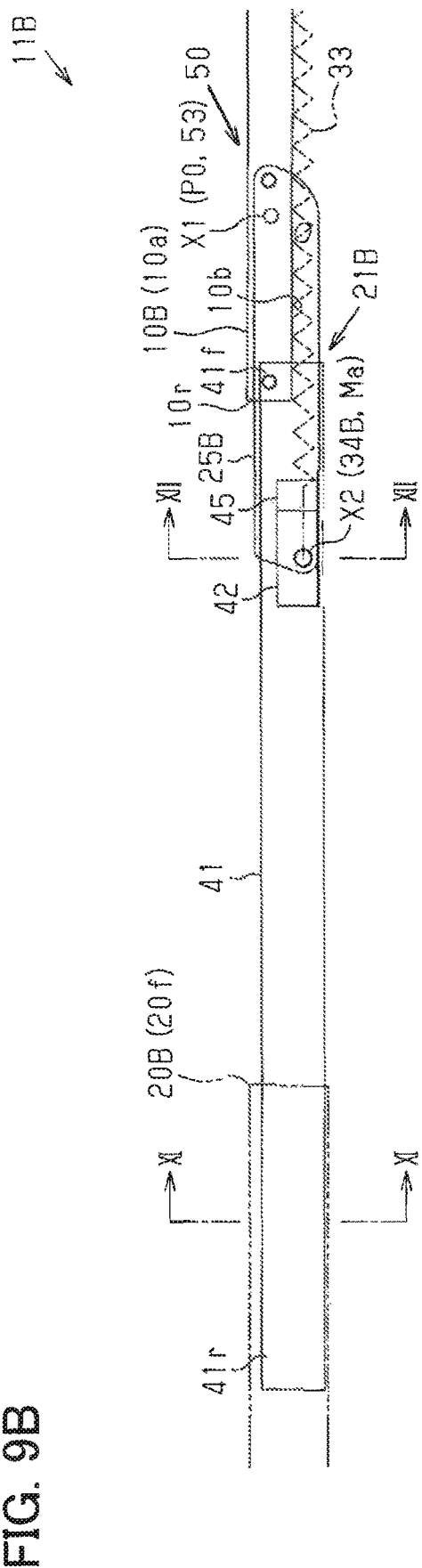

As illustrated in FIG. 8, FIG. 9A, and FIG. 9B, compared to the ramp apparatus 11 of the first embodiment, a ramp apparatus 11B of the second embodiment has moving bodies 21B in different configurations.

In detail, the moving body 21B of the second embodiment includes a sub-guide 41 extending in the extension direction of a guide rail 20B and configured to slide along the guide rail 20B and a support shoe 42 having a second rotatable coupling point X2 of a support arm 25B with respect to the moving body 21B and configured to slide along the extension direction of the sub-guide 41.

Specifically, as illustrated in FIG. 9A to FIG. 12, in the ramp apparatus 11B of the second embodiment, the sub-guide 41 has a rail shape shorter than the guide rail 20B. The sub-guide 41 is capable of sliding in a guide groove 43 extending in drawing and retracting directions of the ramp 10B in a state where the sub-guide 41 is fitted in the guide groove 43 formed with the guide rail 20B. The support shoe 42 is also capable of sliding in a guide groove 44 in a state where the support shoe 42 is fitted in the guide groove 44 formed with the sub-guide 41. The sub-guide 41 of the second embodiment has a stopper 45 that the support shoe 42 abuts when the support shoe 42 slides toward a front end portion 41f side in the guide groove 44.

That is, as described above, in the ramp apparatus 11B of the second embodiment, the user 30 draws the ramp 10B from the storage box 12 (see FIG. 4), and the support shoes 42 coupled with the ramp 10B via the support arms 25B thereby slide from the rear end portion 41r side toward the front end portion 41f side in the guide grooves 44 of the sub-guides 41. The support shoe 42 abuts the stopper 45 arranged in the front end portion 41f of the sub-guide 41, and the sub-guide 41 also slides, integrally with the support shoe 42, from a rear end portion 20r side toward a front end portion 20f side in the guide groove 43 of the guide rail 20B. Accordingly, the ramp apparatus 11B of the second embodiment is configured such that a lift-up operation of the ramp 10B is performed in a state where large portions of the moving bodies 21B are exposed from the front end portions 20f of the guide rails 20.

As illustrated in FIG. 8, in the ramp apparatus 11B of the second embodiment, the left and right moving bodies 21B and 21B share a shaft member 34B configuring the second rotatable coupling point X2. Specifically, the shaft member 34B of the second embodiment is disposed in a form of passing through the left and right support shoes 42 and 42. Accordingly, the ramp apparatus 11B of the second embodiment is configured such that the left and right moving bodies 21B and 21B integrally move in the drawing and retracting directions of the ramp 10B.

As illustrated in FIG. 9A to FIG. 12, the sub-guide 41 of the second embodiment has a bottom plate portion 46. The bottom plate portion 46 extends below the support arm 25B extending forward in a state of being supported by the support shoe 42. In the ramp apparatus 11B of the second embodiment, the bottom plate portion 46 thereby functions as a lower support member 47 regulating rotation of the support arm 25B about the second rotatable coupling point X2 as a pivot such that a first rotatable coupling point X1 does not move to a lower portion than the tension spring 33.

That is, in a case where the first rotatable coupling point X1 of the support arm 25B with respect to the ramp 10B moves to a lower portion than the tension spring 33, the direction of the urging force produced by the tension spring 33 is inverted. Based on this point, in the ramp apparatus 11B of the second embodiment, the bottom plate portion 46 as the lower support member 47 regulates the rotation of the support arm 25B in a direction in which the first rotatable coupling point X1 moves downward from the support position P0 in a case where the ramp 10B moves in the drawing and retracting directions. In the ramp apparatus 11B of the second embodiment, exertion of a stable urging force based on the elastic force of the tension spring 33 is thereby ensured.

As illustrated in FIG. 8 and FIG. 9, the ramp apparatus 11B of the second embodiment includes locking mechanisms 50 that regulate rotation of the ramp 10B about the first rotatable coupling points X1 as pivots in an attitude retaining state in which the attitude in movement of the ramp 10B in the drawing and retracting directions is retained.

Figure 10:
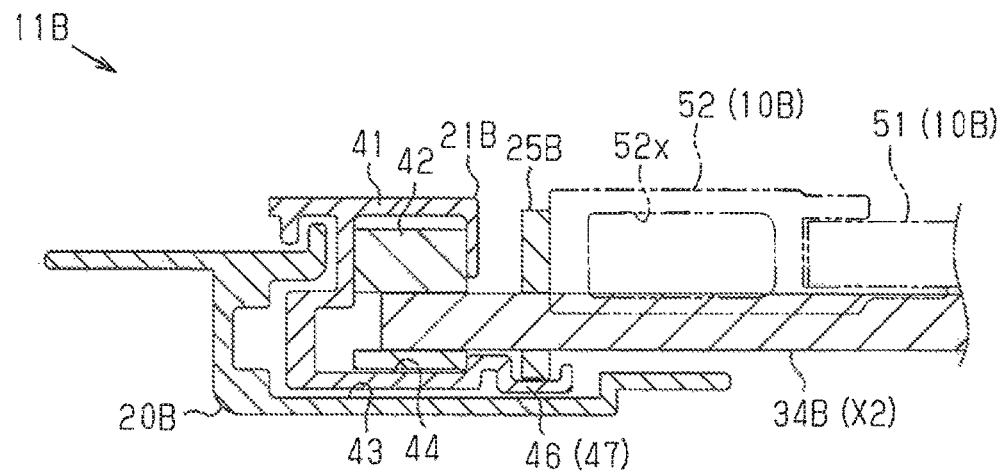
FIG. 10 is a cross-sectional view of the ramp apparatus in the second embodiment.
Figure 11:
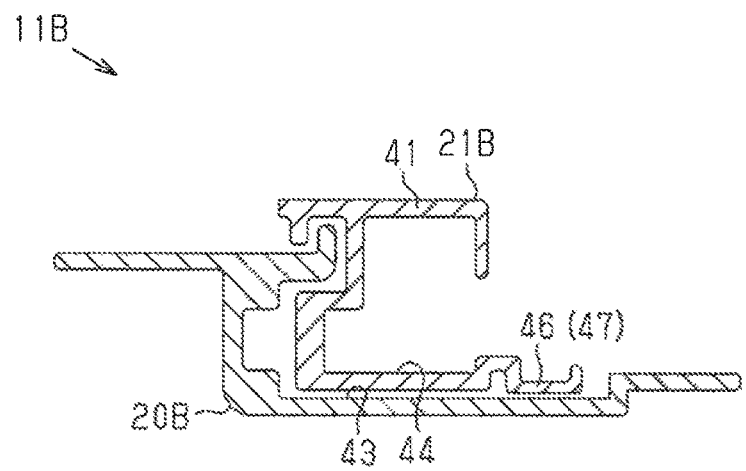
FIG. 11 is a cross-sectional view of the ramp apparatus in the second embodiment.
Figure 12:
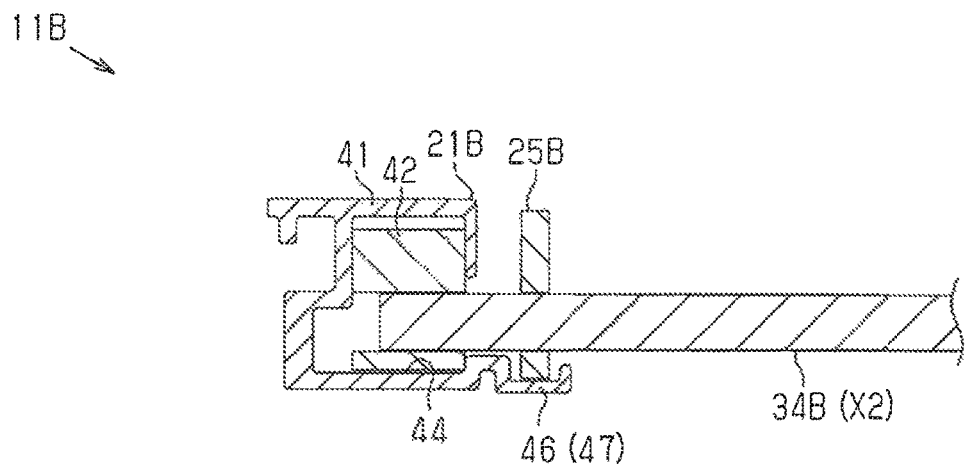
FIG. 12 is a cross-sectional view of the ramp apparatus in the second embodiment.

In detail, as illustrated in FIG. 8 and FIG. 10, the ramp 10B of the second embodiment includes a ramp main body 51 in a generally flat plate shape and side end members 52 and 52 between which both sides of the ramp main body 51 in the width direction are placed. The side end member 52 of the second embodiment is formed in a thin rectangular tube shape. The locking mechanism 50 of the second embodiment is disposed in the rear end portion 10r of the ramp 10B in a state where principal configuration members are arranged in a hollow portion 52x of each of the side end members 52.

Figure 13:
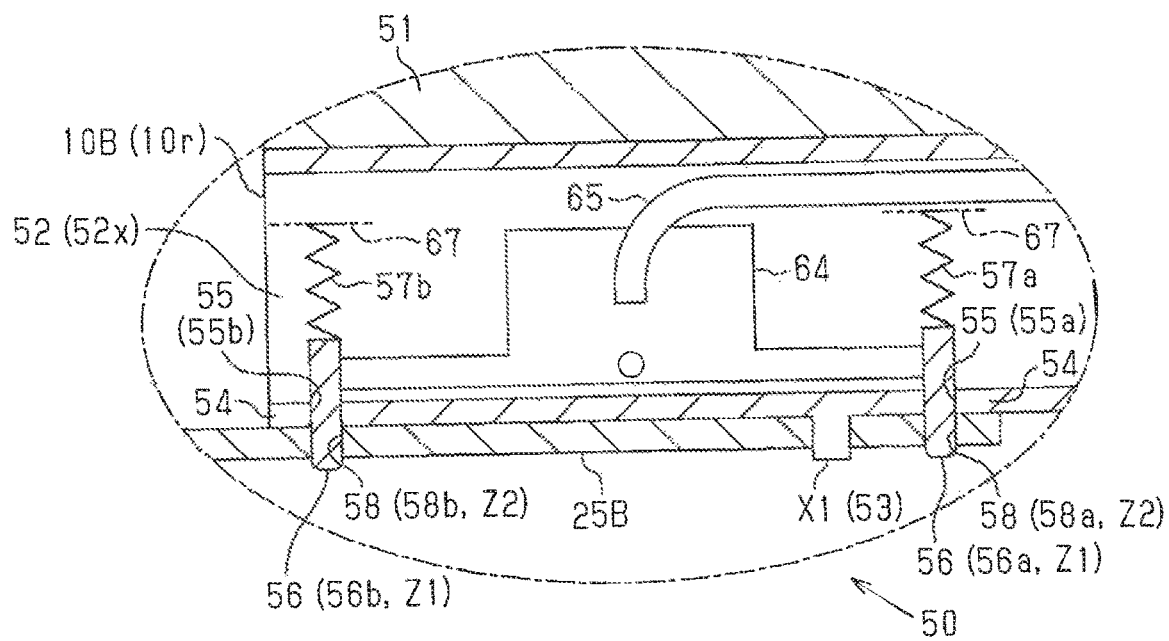
FIG. 13 is an enlarged cross-sectional view of the ramp apparatus in the vicinity of a rear end portion of the ramp in which a locking mechanism is disposed (locked state)
Figure 14:
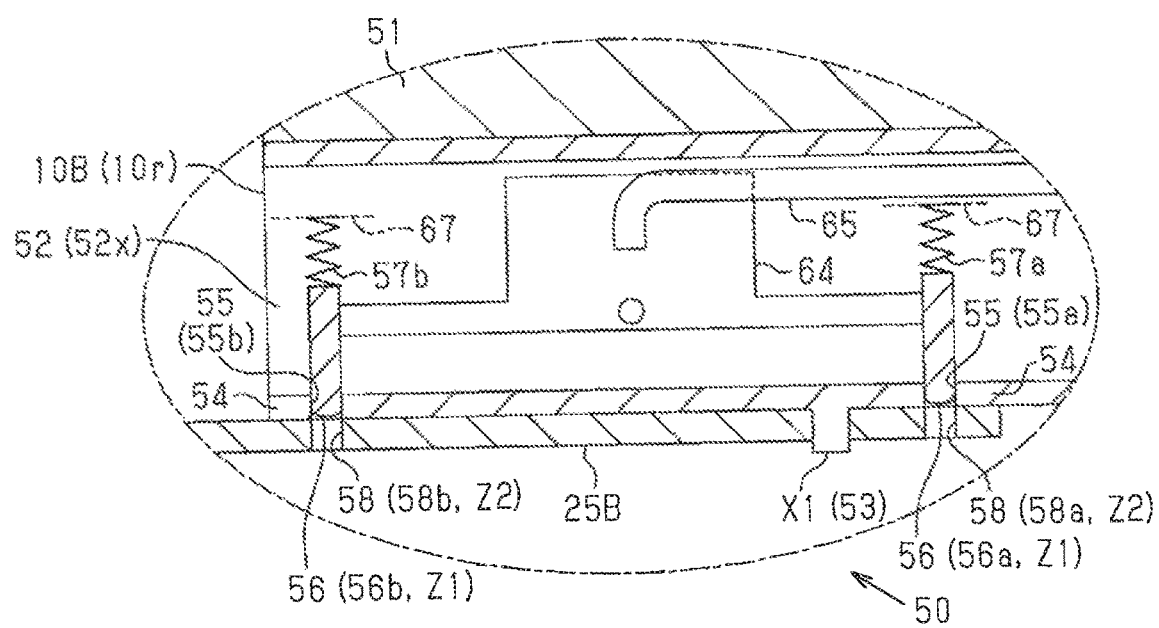
FIG. 14 is an enlarged cross-sectional view of the ramp apparatus in the vicinity of the rear end portion of the ramp in which the locking mechanism is disposed (unlocked state)
Figure 15:
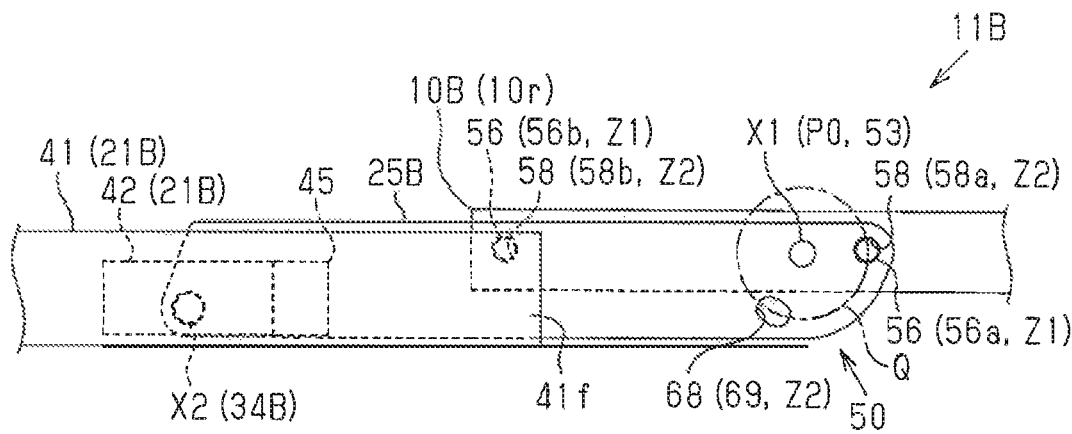
FIG. 15 is a side view of the ramp apparatus in the vicinity of the rear end portion of the ramp in which the locking mechanism is disposed (attitude retaining state)

More in detail, as illustrated in FIG. 13 to FIG. 15, in the ramp apparatus 11B of the second embodiment, insertion holes 55 passing through an outer wall portion 54 in the thickness direction, that is, in the width direction of the ramp 10B are formed in the outer wall portion 54 of the side end member 52 on which a support shaft 53 configuring the first rotatable coupling point X1 is arranged. Specifically, the ramp 10B of the second embodiment has a pair of insertion holes 55a and 55b formed in two positions between which the support shaft 53 configuring the first rotatable coupling point X1 is interposed in the front-rear direction (left-right direction in FIG. 13 and FIG. 14). The ramp apparatus 11B of the second embodiment includes a pair of engagement pins 56a and 56b disposed in the hollow portion 52x of the side end member 52 in a state where tip portions of the engagement pins 56a and 56b are inserted into the insertion holes 55a and 55b. In the hollow portion 52x of the side end member 52, a pair of compression springs 57a and 57b are disposed, the pair of compression springs 57a and 57b producing urging forces in directions in which the respective engagement pins 56a and 56b protrude to a lateral side of the side end member 52 (lower side in FIG. 13 and FIG. 14) via the insertion holes 55a and 55b. A pair of engagement holes 58a and 58b are formed in the support arm 25B, the pair of engagement holes 58a and 58b being opposed to the respective insertion holes 55a and 55b formed in the ramp 10B in the attitude retaining state in a case where the ramp 10B moves in the drawing and retracting directions, in other words, in a state where the support arm 25B and the ramp 10B are aligned generally linearly and the attitude of the ramp 10B thereby becomes generally horizontal.

That is, the locking mechanism 50 of the second embodiment regulates the rotation of the ramp 10B about the first rotatable coupling point X1 of the support arm 25B as a pivot by engagement of the engagement pins 56a and 56b protruded from the respective insertion holes 55a and 55b on the ramp 10B side with the engagement holes 58a and 58b on the support arm 25B side. In the ramp apparatus 11B of the second embodiment, the ramp 10B is thereby capable of being moved in the drawing and retracting directions in a state where the attitude of the ramp 10B is stably retained.

As illustrated in FIG. 8, the ramp apparatus 11B of the second embodiment includes a recess portion 61 opening on the upper surface 10a side in the front end portion 10f of the ramp 10B and an operation lever 62 arranged in the recess portion 61. Specifically, in the ramp apparatus 11B of the second embodiment, the recess portion 61 is arranged in a generally central position in the width direction in the front end portion 10f of the ramp 10B. The operation lever 62 rotates about a support shaft 62x by pulling up a front end portion 62a. In the ramp apparatus 11B of the second embodiment, it is possible to release rotation regulation of the ramp 10B by the locking mechanisms 50 by using the operation lever 62 as a release operation unit 63.

In detail, as illustrated in FIG. 8, FIG. 13, and FIG. 14, the locking mechanism 50 of the second embodiment includes a coupling member 64 coupling the engagement pins 56a and 56b together. In the ramp apparatus 11B of the second embodiment, the coupling member 64 is arranged in the hollow portion 52x in a state where the coupling member 64 is capable of being moved in directions to contact with and separate from the outer wall portion 54 of the side end member 52, the outer wall portion 54 in which the insertion holes 55a and 55b are formed. The ramp apparatus 11B of the second embodiment includes a wire cable 65 connecting the operation lever 62 with the coupling members 64.

That is, in the ramp apparatus 11B of the second embodiment, an operation force input to the operation lever 62 is transmitted to the coupling members 64 of the locking mechanisms 50 via the wire cable 65. Specifically, as described above, a force by the user 30 for pulling up the operation lever 62 is converted to tensile forces in directions for separating the coupling members 64 from the outer wall portions 54 in a manner such that the wire cable 65 connecting the operation lever 62 with the coupling members 64 tugs the coupling members 64 and the coupling members 64 are thereby separated from the outer wall portions 54 of the side end members 52 in which the insertion holes 55a and 55b are formed. The movement of the coupling member 64 causes the engagement pins 56a and 56b connected with each other via the coupling member 64 to enter the hollow portion 52x of the side end member 52 against the urging forces of the compression springs 57a and 57b. Accordingly, in the ramp apparatus 11B of the second embodiment, the engagement pins 56a and 56b are disengaged from the engagement holes 58a and 58b on the support arm 25B side, and the rotation regulation of the ramp 10B by the locking mechanism 50 is thereby released.

In the ramp apparatus 11B of the second embodiment, the wire cable 65 is arranged in the hollow portions 52x of the side end members 52. The compression springs 57a and 57b are respectively compressed between the corresponding engagement pins 56a and 56b and a support wall 67 disposed in the hollow portion 52x of the side end member 52. The ramp apparatus 11B of the second embodiment is configured such that the user 30 removes a hand from the operation lever 62 and the engagement pins 56a and 56b thereby again protrude to the lateral side of the side end member 52 via the respective insertion holes 55a and 55b based on the urging forces of the respective compression springs 57a and 57b.

Figure 16:
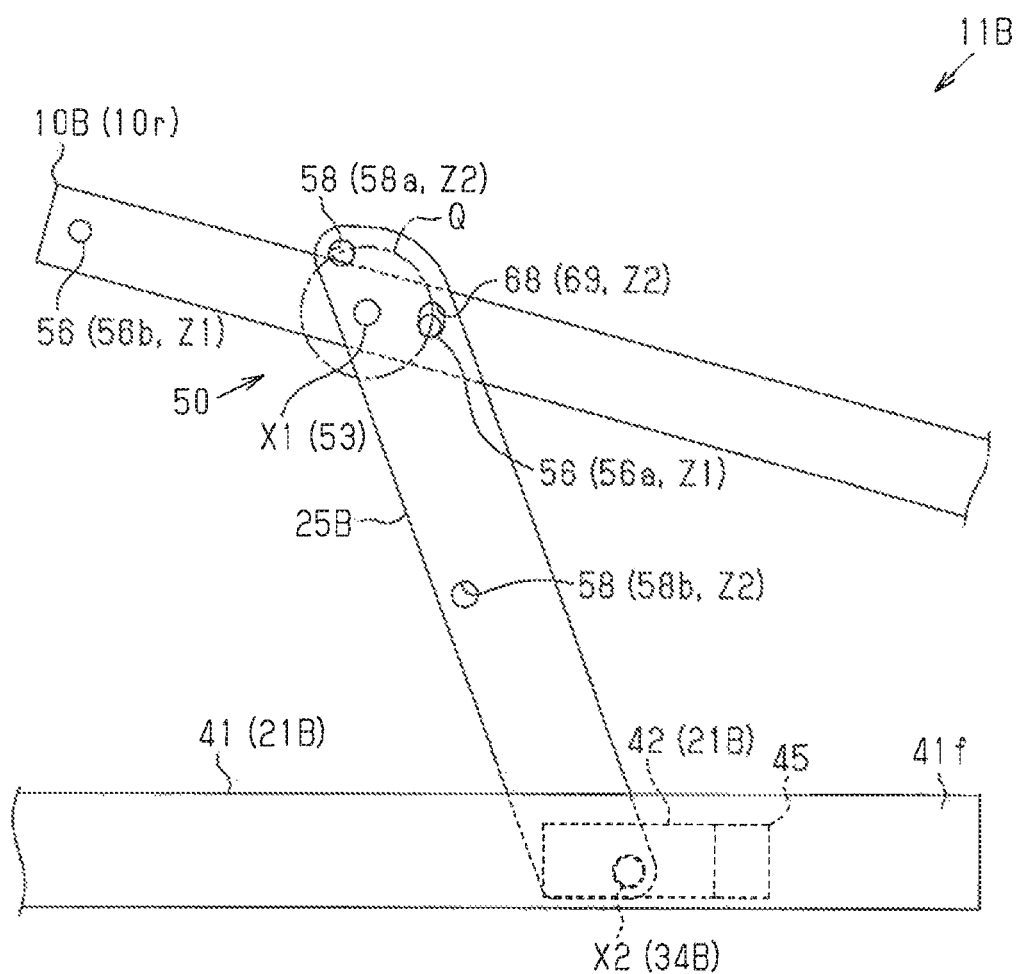
FIG. 16 is a side view of the ramp apparatus in the vicinity of the rear end portion of the ramp in which the locking mechanism is disposed (lifted-up state)

As illustrated in FIG. 16, an engagement hole 68 is formed in the support arm 25B of the second embodiment, the engagement hole 68 being opposed to the insertion hole 55a formed in the ramp 10B in a lifted-up state where the first rotatable coupling point X1 is lifted upward.

Specifically, as illustrated in FIG. 15 and FIG. 16, in the ramp apparatus 11B of the second embodiment, the engagement hole 68 is arranged on a concentric circle Q having the first rotatable coupling point X1 as the center, similarly to the insertion hole 55a formed in a portion closer to the front end portion 10f of the ramp 10B than the support shaft 53 configuring the first rotatable coupling point X1. That is, when the first rotatable coupling point X1 is lifted up by the rotation of each of the support arms 25B, the engagement hole 68 moves to the position opposed to the insertion hole 55a formed on the ramp 10B side due to relative rotation of the ramp 10B with respect to each of the support arms 25B. In the ramp apparatus 11B of the second embodiment, the engagement pin 56a protruded from the insertion hole 55a on the ramp 10B side thereby engages with the engagement hole 68 on the support arm 25B side.

That is, the locking mechanism 50 of the second embodiment has a function of regulating the rotation of the ramp 10B about the first rotatable coupling point X1 of the support arm 25B as a pivot by engagement between the engagement pin 56a and the engagement hole 68 in a state where the ramp 10B is lifted up. Accordingly, the ramp apparatus 11B of the second embodiment is capable of stably retaining an inclination given to the ramp 10B by the rotation about the first rotatable coupling point X1.

Figure 17:
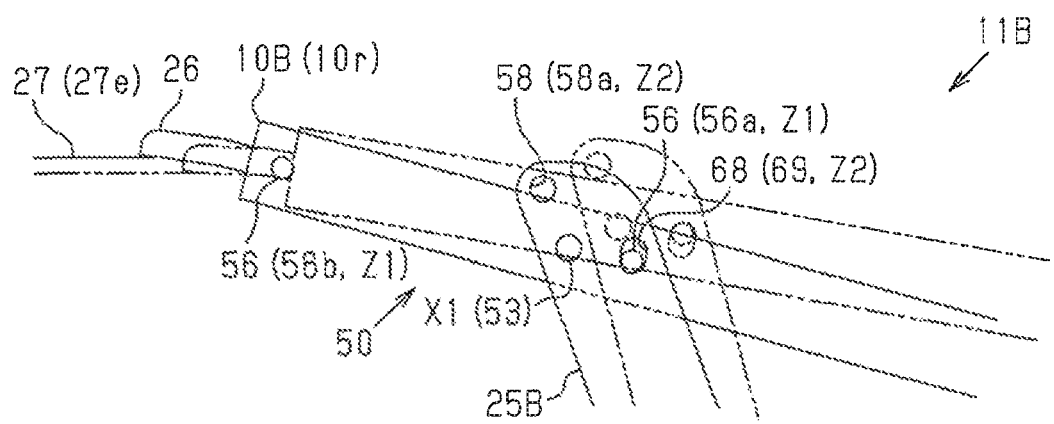
FIG. 17 is an action explanation diagram of a long hole configuring an engagement hole of the locking mechanism.

More in detail, as illustrated in FIG. 15 to FIG. 17, in the ramp apparatus 11B of the second embodiment, the engagement hole 68 on the support arm 25B side is formed as a long hole 69 extending along the circumferential direction of the concentric circle Q passing the engagement hole 68 and the insertion hole 55a. That is, the locking mechanism 50 of the second embodiment allows the rotation of the ramp 10B about the first rotatable coupling point X1 as a pivot in the range of the long hole 69 in which the engagement pin 56a is movable in the engagement hole 68. Accordingly, in the ramp apparatus 11B of the second embodiment, even in a case where the positional relationship between the rear end portion 10r of the ramp 10B in the lifted-up state and the vehicle floor 27 is not necessarily steady, the floor engagement portion 26 attached to the rear end portion 10r is capable of being stably engaged with the edge portion 27e of the vehicle floor 27.

Next, effects of the second embodiment will be described.

(1) The ramp apparatus 11B includes the lower support members 47 regulating the rotation of the support arms 25B about the second rotatable coupling points X2 as pivots such that the first rotatable coupling points X1 do not move to a lower portion than the tension springs 33.

That is, in a case where the first rotatable coupling point X1 moves to a lower portion than the tension spring 33, the direction of the urging force produced by the tension spring 33 is inverted. However, in the aforementioned configuration, the lower support member 47 disposed below the support arm 25B may regulate the rotation of the support arm 25B in the direction in which the first rotatable coupling point X1 moves downward. Accordingly, exertion of a stable urging force based on the elastic force of the tension spring 33 is thereby ensured.

(2) The moving body 21B includes the sub-guide 41 configured to slide along the guide rail 20B and the support shoe 42 having the second rotatable coupling point X2 and configured to slide along the extension direction of the sub-guide 41.

In the aforementioned configuration, the sub-guide 41 sliding along the guide rail 20B elongates the guide rail 20B, and this enables the length of the guide rail 20B to be shortened. Accordingly, a configuration is made in which the guide rails 20B are less visible from the outside of the vehicle in a case where the ramp 10B is in a retracted state, and high designability may thereby be secured.

(3) The sub-guide 41 includes the bottom plate portion 46 extending below the support arm 25B. The bottom plate portion 46 functions as the lower support member 47 regulating the rotation of the support arm 25B such that the first rotatable coupling point X1 with respect to the ramp 10B does not move to a lower portion than the tension spring 33.

In the aforementioned configuration, the bottom plate portion 46 arranged in the sub-guide 41 may regulate the rotation of the support arm 25B in the direction in which the first rotatable coupling point X1 moves downward from the support position P0 (FIG. 3A and FIG. 6) in a case where the ramp 10B moves in the drawing and retracting directions. Accordingly, in a simple configuration, the first rotatable coupling point X1 of the support arm 25B may be prevented from moving to a lower portion than the tension spring 33.

(4) The ramp apparatus 11B includes the locking mechanisms 50 that regulate the rotation of the ramp 10B about the first rotatable coupling points X1 as pivots in a state where the attitude in movement of the ramp 10B in the drawing and retracting directions is retained. Accordingly, the ramp 10B may be moved in the drawing and retracting directions in a state where the attitude of the ramp 10B is stably retained.

(5) The locking mechanism 50 includes a function of regulating the rotation of the ramp 10B in a lifted-up state where the first rotatable coupling point X1 is lifted up by the rotation of the support arm 25B. Accordingly, an inclination given to the ramp 10B by the rotation of the first rotatable coupling point X1 may stably be retained.

(6) In the locking mechanism 50, engagement pins 56 as first engagement portions Z1 engage with engagement holes 58 and 68 as second engagement portions Z2, and the rotation of the ramp 10B about the first rotatable coupling point X1 as a pivot is thereby regulated. Accordingly, a highly reliable locking mechanism 50 may be formed in a simple configuration.

(7) In a state where the ramp 10B is lifted up, the engagement hole 68 on the support arm 25B side with which the engagement pin 56a on the ramp 10B side engages has a configuration as the long hole 69.

In the aforementioned configuration, the rotation of the ramp 10B about the first rotatable coupling point X1 as a pivot may be allowed in the range of the long hole 69 in which the engagement pin 56a is movable in the engagement hole 68. Accordingly, even in a case where the positional relationship between the rear end portion 10r of the ramp 10B in the lifted-up state and the vehicle floor 27 is not necessarily steady, the floor engagement portion 26 attached to the rear end portion 10r of the ramp 10B may stably be engaged with the edge portion 27e of the vehicle floor 27.

(8) The ramp apparatus 11B includes, in the front end portion 10f of the ramp 10B, the release operation unit 63 for releasing the rotation regulation of the ramp 10B by the locking mechanisms 50.

In the aforementioned configuration, the user 30 drawing the ramp 10B from the storage box 12 may release the rotation regulation of the ramp 10B by the locking mechanisms 50 while not changing the standing position but keeping being positioned on the front end portion 10f side of the ramp 10B and may shift the ramp 10B to the lifted-up state. Accordingly, convenience for the user 30 may be improved.

The aforementioned embodiments may be carried out by being changed as follows. The aforementioned embodiments and following modifications may be carried out in combination in the scope in which contradiction does not occur between techniques.

The ramp apparatus 11 described in the first embodiment, the first end portion 33a of the tension spring 33 is hooked on the shaft member 34 configuring the second rotatable coupling point X2, and the second end portion 33b is hooked on the hooking protrusion 35 arranged on the lower surface 10b of the ramp 10. However, configurations are not limited to this, but the setting positions of the connection point Ma of the tension spring 33 with respect to the moving body 21 and the connection point Mb of the tension spring 33 with respect to the ramp 10 may arbitrarily be changed as long as the first rotatable coupling point X1 is arranged above the tension spring 33.

In the ramp apparatus 11 described in the first embodiment, the pull-up member 31 attached to the upper surface 10a of the ramp 10 has the connection portions 31a in the rear end portion 10r of the ramp 10 and has the configuration as the rod-shaped member 32 extending toward the front end portion 10f side of the ramp 10. However, configurations are not limited to this, but a flexible string-like member may be used as the pull-up member 31, for example.

The pull-up member 31 may not necessarily be a member formed into a long shape having the connection portions 31a in the rear end portion 10r of the ramp 10 and extending toward the front end portion 10f side of the ramp 10.

Figure 18:
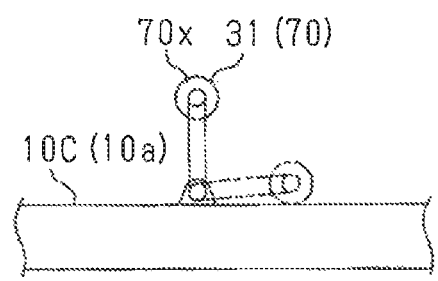
FIG. 18 is a side view of a handle member configuring a pull-up member in another example.
Figure 19:
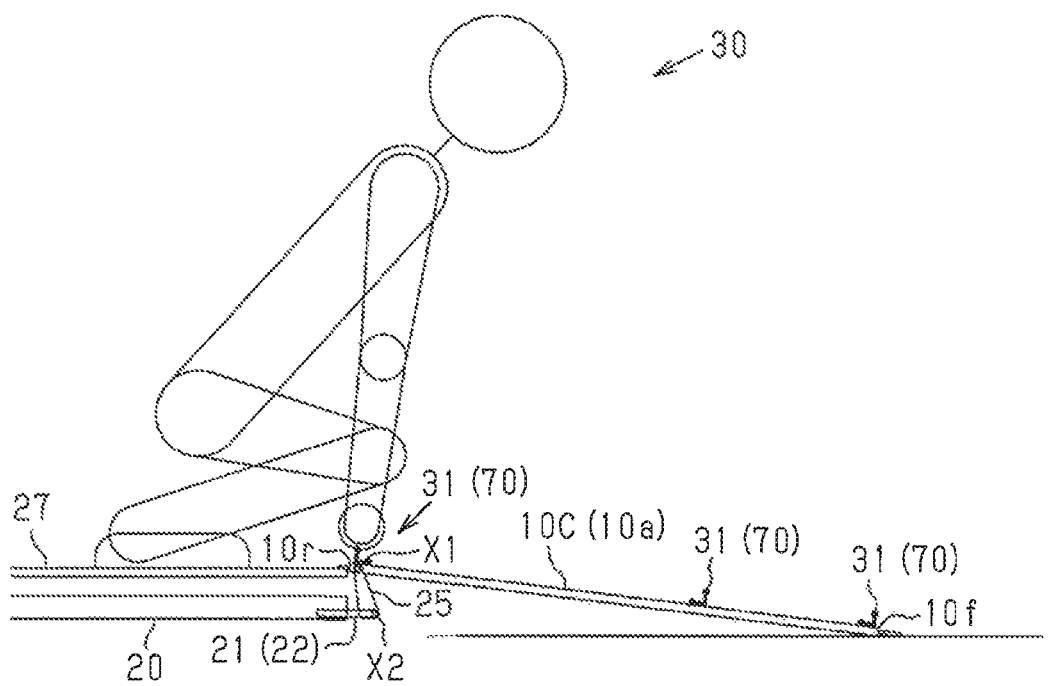
FIG. 19 is an explanatory diagram of a lift-up operation by using the pull-up member in another example.

For example, as illustrated in FIG. 18 and FIG. 19, a configuration is possible in which a handle member 70 having a grip portion 70x protruding upward from the upper surface 10a of a ramp 10C is used as the pull-up member 31. The handle member 70 illustrated in FIG. 18 and FIG. 19 is configured to be capable of being leaned on the ramp 10C when the handle member 70 is not used; however, it is possible to use a handle member retained in a state of protruding upward from the upper surface 10a of the ramp 10C. A position in which such a handle member 70 is attached may not necessarily be the rear end portion 10r of the ramp 10C but may be set to the front end portion 10f side of the ramp 10C. The ramp apparatus may include plural pull-up members 31 attached to the upper surface 10a of the ramp 10C.

In the ramp apparatus 11B described in the second embodiment, the bottom plate portion 46 arranged in the sub-guide 41 configuring the moving body 21B functions as the lower support member 47. However, the ramp apparatus 11 described in the first embodiment may be configured such that as the slider 22 configuring the moving body 21, a member in which the second rotatable coupling point X2 of the support arm 25 is disposed functions as the lower support member 47 like the bottom plate portion 46. The ramp apparatus may include the lower support member 47 disposed independently from the moving body 21 or 21B.

In the ramp apparatus 11B described in the second embodiment, the locking mechanism 50 regulates the rotation of the ramp 10B about the first rotatable coupling point X1 as a pivot by engagement between the engagement pins 56 as the first engagement portions Z1 and the engagement holes 58 and 68 as the second engagement portions Z2. However, configurations are not limited to this, but the configuration of the locking mechanism 50 may arbitrarily be changed. For example, a configuration is possible in which an engagement hole as the first engagement portion Z1 is formed and an engagement pin as the second engagement Z2 is disposed. A configuration is possible in which one of the first engagement portion Z1 and the second engagement portion Z2 is a hook-like member and the other is an engagement protrusion portion or engagement recess portion corresponding to this hook-like member, for example.

The locking mechanisms 50 may be configured to regulate the rotation of the ramp 10B only in a state where the attitude in movement of the ramp 10B in the drawing and retracting directions is retained. The locking mechanisms 50 may be configured to regulate the rotation of the ramp 10B only in a state where the ramp 10B is lifted up.

In the ramp apparatus 11B described in the second embodiment, the release operation unit 63 for releasing the rotation regulation of the ramp 10B by the locking mechanisms 50 is arranged in the front end portion 10f of the ramp 10B; however, the configuration and arrangement of the release operation unit 63 may arbitrarily be changed. In addition, the wire cable 65 may not necessarily be used as a connection member for transmission from the release operation unit 63 to the locking mechanisms 50.

In the aforementioned embodiments, the urging forces exerted based on the elastic forces of the respective tension springs 33 are set to magnitudes adequate for assisting the lift-up operation of the ramp 10 by the user 30. However, configurations are not limited to this, but the magnitudes of the urging forces based on the elastic forces of the respective tension springs 33 may arbitrarily be changed. For example, a configuration is possible in which such large urging forces are exerted that the ramp 10B is lifted up without a force particularly applied by the user 30 when the rotation regulation of the ramp 10B by the locking mechanisms 50 is released. Accordingly, convenience for the user 30 may further be improved.

Next, descriptions will be made about the technical ideas that may be understood from the aforementioned embodiments and modifications.

(A) A ramp apparatus for a vehicle in which the pull-up member is a rod-shaped member being rotatable upward and downward about the connection portion as a pivot.

In the aforementioned configuration, high operation rigidity as the pull-up member may be secured without impairing gripping easiness. Accordingly, not only a simple pull-up operation but also operation input in all directions is enabled, and higher operability may be secured.

(B) A ramp apparatus for a vehicle in which the locking mechanism regulates the rotation of the ramp by engagement between an engagement pin as the first engagement portion and an engagement hole as the second engagement portion. Accordingly, a highly reliable locking mechanism may be formed in a simple configuration.

(C) A ramp apparatus for a vehicle in which the engagement hole with which the engagement pin engages in the lifted-up state has a configuration as a long hole.

In the aforementioned configuration, the rotation of a ramp about the first rotatable coupling point as a pivot may be allowed in the range of the long hole in which the engagement pin is movable in the engagement hole. Accordingly, even in a case where the positional relationship between a rear end portion of the ramp in the lifted-up state and a vehicle floor is not necessarily steady, the rear end portion of the ramp may stably be engaged with an edge portion of the vehicle floor.

What is claimed is:

1. A ramp apparatus for a vehicle, the ramp apparatus comprising:
    a ramp configured to be retractable in the vehicle and drawable to an outside of the vehicle;
    a moving body configured to be movable in a drawing direction and a retracting direction together with the ramp;
    a support arm rotatably coupled with the ramp at a first rotatable coupling point and rotatably coupled with the moving body at a second rotatable coupling point; and
    a tension spring interposed between the ramp and the moving body, wherein
    the ramp is arranged in a lifted-up position in which the ramp is arranged to face a door opening of the vehicle from a drawn position by rotating of the first rotatable coupling point about the second rotatable coupling point via the support arm, and
    the tension spring rotationally urges the first rotatable coupling point in a position above the tension spring in the drawn position of the ramp about the second rotatable coupling point and exerts an urging force on the ramp, the urging force moving the ramp from the drawn position toward the lifted-up position.

2. The ramp apparatus for a vehicle according to claim 1, further comprising
    a lower support member configured to regulate rotation of the support arm about the second rotatable coupling point such that the first rotatable coupling point does not move to a lower portion than the tension spring.

3. The ramp apparatus for a vehicle according to claim 2, further comprising
    a guide rail configured to guide the moving body in the drawing and retracting directions of the ramp, wherein
    the moving body includes:
    a sub-guide extending in an extension direction of the guide rail and configured to slide along the guide rail; and
    a support shoe having the second rotatable coupling point and configured to slide along an extension direction of the sub-guide, and
    the sub-guide constitutes the lower support member.

4. The ramp apparatus for a vehicle according to claim 1, further comprising
    a pull-up member attached to an upper surface of the ramp.

5. The ramp apparatus for a vehicle according to claim 4, wherein
    the pull-up member has a connection portion with respect to the ramp in a rear end portion of the ramp and extends toward a front end portion of the ramp, the first rotatable coupling point being arranged in the rear end portion.

6. The ramp apparatus for a vehicle according to claim 4, wherein
    the pull-up member is a handle member having a grip portion protruding upward from the upper surface of the ramp.

7. The ramp apparatus for a vehicle according to claim 1, further comprising a locking member configured to regulate rotation of the ramp about the first rotatable coupling point and retain an attitude in a case where the ramp moves in the drawing and retracting directions.

8. The ramp apparatus for a vehicle according to claim 7, wherein
the locking mechanism regulates rotation of the ramp in the lifted-up position.

9. The ramp apparatus for a vehicle according to claim 7, further comprising:
a first engagement portion arranged in the ramp; and
a second engagement portion arranged in the support arm, wherein
the locking mechanism regulates rotation of the ramp by engagement between the first engagement portion and the second engagement portion.

10. The ramp apparatus for a vehicle according to claim 7, further comprising
a release operation unit arranged in a front end portion of the ramp on an opposite side from a rear end portion of the ramp and configured to release rotation regulation of the ramp by the locking mechanism, the first rotatable coupling point being arranged in the rear end portion.

\* \* \* \* \*